(12) United States Patent
Kinuhata et al.

(10) Patent No.: US 10,773,764 B2
(45) Date of Patent: Sep. 15, 2020

(54) PROCESSING SYSTEM FOR STRADDLE VEHICLE

(71) Applicant: KAWASAKI JUKOGYO KABUSHIKI KAISHA, Kobe-shi, Hyogo (JP)

(72) Inventors: Masanori Kinuhata, Kobe (JP); Masayuki Enomoto, Kobe (JP); Hiroshi Ishii, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/090,107

(22) PCT Filed: Mar. 30, 2016

(86) PCT No.: PCT/JP2016/001855
§ 371 (c)(1),
(2) Date: Sep. 28, 2018

(87) PCT Pub. No.: WO2017/168465
PCT Pub. Date: Oct. 5, 2017

(65) Prior Publication Data
US 2019/0118887 A1 Apr. 25, 2019

(51) Int. Cl.
| | | |
|---|---|---|
| *B60Q 1/00* | (2006.01) |
| *B62J 3/00* | (2020.01) |
| *B62J 99/00* | (2020.01) |
| *B60R 16/037* | (2006.01) |
| *A42B 3/30* | (2006.01) |
| *B62J 45/10* | (2020.01) |
| *B62K 23/02* | (2006.01) |

(52) U.S. Cl.
CPC ............ *B62J 3/00* (2013.01); *A42B 3/30* (2013.01); *B60R 16/037* (2013.01); *B62J 99/00* (2013.01); *B62J 45/10* (2020.02); *B62K 23/02* (2013.01)

(58) Field of Classification Search
CPC ...... B62J 3/00; B62J 99/00; B62J 2099/0006; A42B 3/30; B60R 16/037; B62K 23/02
See application file for complete search history.

(56) References Cited

U.S. PATENT DOCUMENTS 5,006,072 A * 4/1991 Letovsky ............... G09B 9/058
348/121
6,876,845 B1 4/2005 Tabata et al.
(Continued)

FOREIGN PATENT DOCUMENTS

JP 2001148657 A 5/2001
JP 2002-264874 * 9/2002 ............ A42B 3/30
(Continued)

*Primary Examiner* — Quang Pham
(74) *Attorney, Agent, or Firm* — Alleman Hall Creasman & Tuttle LLP

(57) ABSTRACT

A processing system for a straddle vehicle, comprises an input section which receives information relating to a reaction of a rider; a processor section which learns a reaction trend of the rider based on the information relating to the rider's reaction which is input from the input section, and generates information to be output, based on a learning content of the reaction trend of the rider; and an output section which transmits the information generated by the processor section.

15 Claims, 6 Drawing Sheets

(56) References Cited

U.S. PATENT DOCUMENTS

| | | | | |
|---|---|---|---|---|
| 7,107,271 | B2* | 9/2006 | Aoki | H04H 60/31 |
| 2004/0225419 | A1* | 11/2004 | Sakai | B60R 25/252 |
| | | | | 701/1 |
| 2005/0021341 | A1* | 1/2005 | Matsubara | G10L 15/07 |
| | | | | 704/275 |
| 2007/0124029 | A1* | 5/2007 | Hattori | B60Q 9/00 |
| | | | | 701/1 |
| 2007/0182532 | A1* | 8/2007 | Lengning | G10H 1/0041 |
| | | | | 340/439 |
| 2007/0198444 | A1* | 8/2007 | Movellan | G06N 3/008 |
| | | | | 706/12 |
| 2009/0099721 | A1* | 4/2009 | Imai | B60W 50/16 |
| | | | | 701/46 |
| 2015/0042160 | A1* | 2/2015 | Matsuda | B62K 11/04 |
| | | | | 307/10.3 |
| 2015/0074197 | A1* | 3/2015 | Brown | H04W 4/80 |
| | | | | 709/204 |
| 2015/0286598 | A1* | 10/2015 | Murakami | H04N 21/4725 |
| | | | | 710/113 |
| 2016/0104486 | A1* | 4/2016 | Penilla | G10L 15/005 |
| | | | | 704/232 |
| 2017/0021785 | A1* | 1/2017 | Lim | B60R 16/0373 |
| 2019/0111940 | A1* | 4/2019 | Kinuhata | G08G 1/16 |
| 2019/0126913 | A1* | 5/2019 | Kinuhata | B60W 30/18 |

FOREIGN PATENT DOCUMENTS

| | | | |
|---|---|---|---|
| JP | 2002264874 | A | 9/2002 |
| JP | 2007038932 | A | 2/2007 |
| JP | 2011073565 | A | 4/2011 |

* cited by examiner

PROCESSING SYSTEM FOR STRADDLE VEHICLE

TECHNICAL FIELD

The present invention relates to a processing system for (for use with) a straddle vehicle.

BACKGROUND ART

In an example of a straddle vehicle, an in-vehicle system such as a GPS in-vehicle system which performs an operation in response to a voice command is equipped in this straddle vehicle (see e.g., Patent Literature 1).

PATENT LITERATURE

Patent Literature 1: Japanese Laid-Open Patent Application Publication No. 2002-264874

SUMMARY OF INVENTION

Technical Problem

In the configuration disclosed in Patent Literature 1, it is necessary to input a voice command each time, and an operation may be sometimes burdensome. Also, it is sometimes difficult for a rider to obtain vehicle information at a proper timing.

In view of the above, an object of the present invention is to allow a rider to easily recognize information desired by the rider in a straddle vehicle.

Solution to Problem

According to an aspect of the present invention, a processing system for a straddle vehicle, comprises an input section which receives information relating to a reaction of a rider; a processor section which learns a reaction trend of the rider based on the information relating to the rider's reaction which is input from the input section, and generates information to be output, based on a learning content of the reaction trend of the rider; and an output section which transmits the information generated by the processor section.

In accordance with this configuration, since the processor section learns the reaction trend of the rider based on the information relating to the rider's reaction, the learning content obtained by the processor section can be familiarized. This makes it possible to generate the information based on the reaction trend of the rider and transmit the information at a timing desired by the rider. For example, the output of the information which is not desired by the rider can be reduced, and the rider can obtain the information at a proper timing. The rider can easily focus on the driving operation. Since the learning content is familiarized, the information desired by the rider can be easily transmitted.

In the above-described aspect, the information relating to the rider's reaction may include information relating to whether or not the information transmitted from the output section is good.

In accordance with this configuration, since the processor section can learn as the information relating to the rider's reaction, whether or not the information transmitted from the output section is good. Therefore, the learning content obtained by the processor section can be more familiarized.

In the above-described aspect, the input section may receive the information relating to the rider's reaction from an operation device which is mounted in a vehicle body and is capable of being operated by the rider during driving of the straddle vehicle.

In accordance with this configuration, since the input section receives the information relating to the rider's reaction from the operation device which can be operated by the rider while the rider is driving the straddle vehicle, it becomes possible to transmit the information relating to the rider's reaction to the processor section with a higher accuracy, compared to a case where the rider's reaction is received as a voice signal.

In the above-described aspect, the input section may further receive information relating to a vehicle state which is detected by a detector mounted in the vehicle body, and the processor section may learn the reaction trend of the rider and the vehicle state, and generate the information to be output, based on the learning content of the reaction trend of the rider and a learning content of the vehicle state.

In accordance with this configuration, the processor section can reflect the information relating to the vehicle state in the learning content, in addition to the information relating to the rider's reaction. This allows the processor section to set the timing at which the output section transmits the information, based on the vehicle state, for example.

In the above-described aspect, the input section and the processor section may be disposed outside the vehicle body, and the processing system may further comprise a wireless communication section which wirelessly transmits the information relating to the vehicle state which is detected by the detector, to the input section, and the wireless communication section may be mounted in the vehicle body.

In accordance with this configuration, since the input section which wirelessly communicates the information relating to the vehicle state with the wireless communication section inputs the information relating to the rider's reaction to the processor section located outside the vehicle body along with the input section. Therefore, compared to a case where the processor section is mounted in the vehicle body, durability required for the input section and the processor section can be reduced, and manufacturing cost of the input section and the processor section can be reduced.

In the above-described aspect, the processor section may be a server provided at a location that is distant from the vehicle body and the rider, and the input section may be carried by the rider and may wireless communicate with the processor section and the detector.

In accordance with this configuration, compared to a case where the input section and the processor section are mounted in the vehicle body, durability required for the input section and the processor section can be reduced, and manufacturing cost of the input section and the processor section can be reduced.

In the above-described aspect, the processor section may generate the information to be output, as a voice signal, the output section may be carried by the rider, and wirelessly communicate the voice signal between the processor section and a microphone and a speaker provided at a helmet worn by the rider.

In accordance with this configuration, the output section wirelessly transmits the information in the form of the voice signal to the microphone and the speaker which are provided at the helmet worn by the rider. This allows the rider to recognize the information without shifting the rider's eyes in the straddle vehicle in which a driving burden on the rider is high during traveling. Since the output section is carried by the rider, durability required for the output section can be reduced, and manufacturing cost of the output section can be reduced.

In the above-described aspect, the processor section may learn the reaction trend of the rider so that the reaction trend of the rider corresponds to identification information set for each of straddle vehicles.

In accordance with this configuration, in a case where the same person owns a plurality of vehicles, the processor section of the processing system can obtain the learning content made different between the vehicles. This allows the rider to recognize the information desired by the rider, in each of the plurality of vehicles.

Advantageous Effects of Invention

In accordance with the present invention, the rider can easily recognize the information desired by the rider in the straddle vehicle.

DESCRIPTION OF EMBODIMENTS

Figure 1:
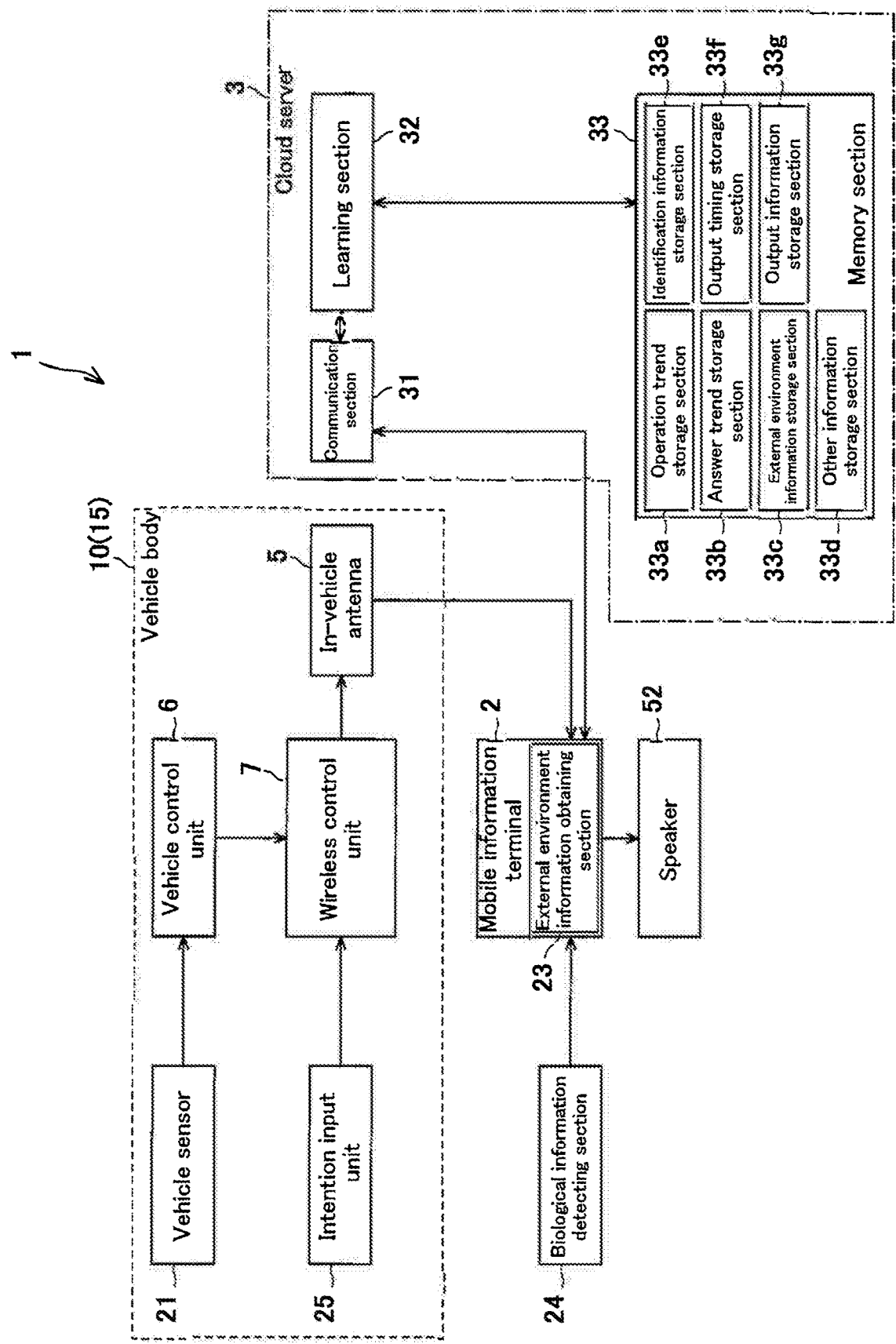
FIG. 1 is a block diagram of a processing system for (for use with) a straddle vehicle according to Embodiment 1.

Hereinafter, the embodiments will be described with reference to the drawings. Throughout the drawings, the same or corresponding components (constituents) are designated by the same reference numerals, and will not be described in repetition.

Embodiment 1

Figure 2:
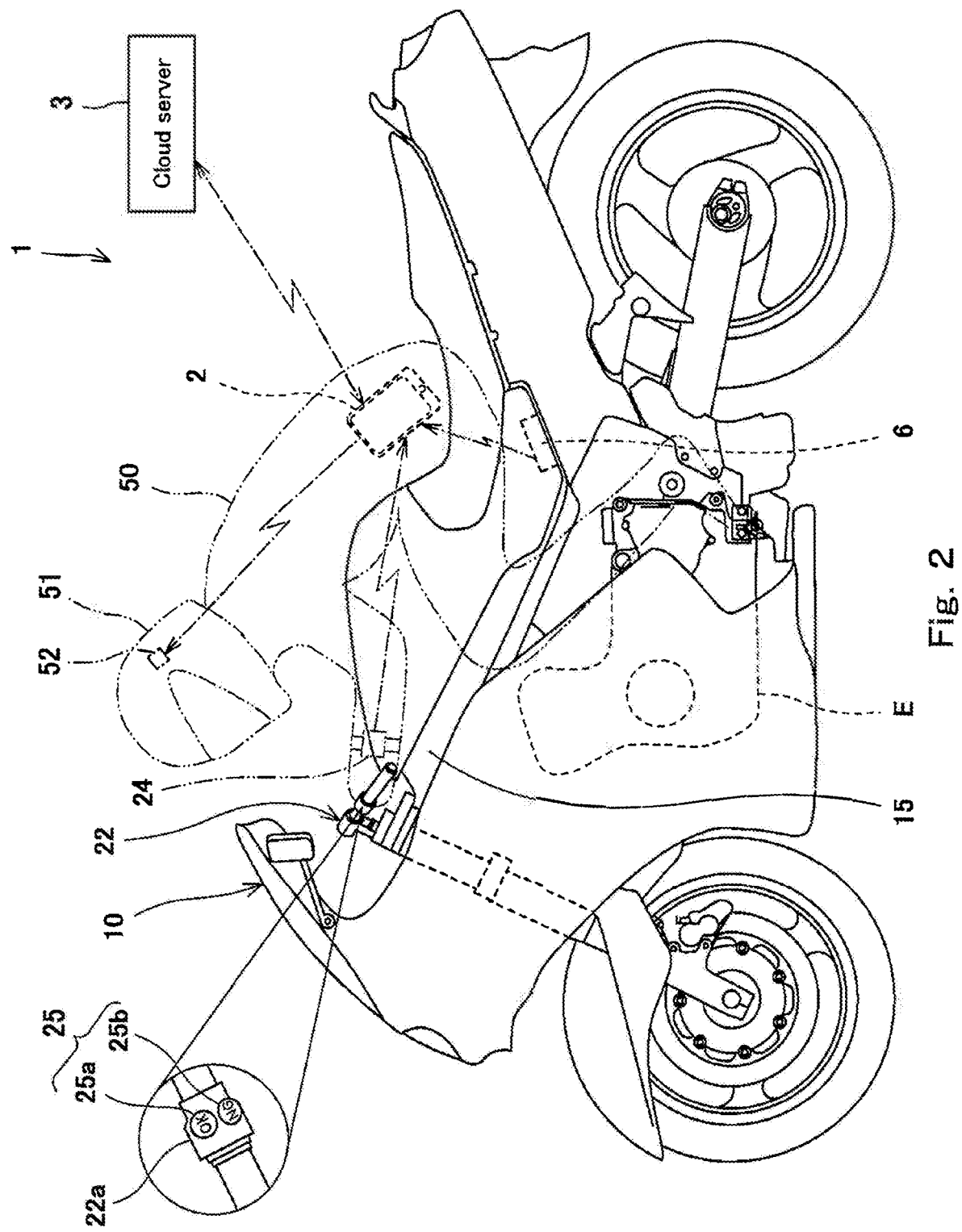
FIG. 2 is a conceptual view showing the configuration of the processing system for the straddle vehicle of FIG. 1.

FIG. 1 is a block diagram of a processing system 1 for (for use with) a straddle vehicle according to Embodiment 1 (hereinafter will be referred to as the processing system 1). FIG. 2 is a conceptual view showing the configuration of the processing system 1 of FIG. 1. Hereinafter, a motorcycle will be described as an example of a straddle vehicle 10. As shown in FIGS. 1 and 2, a motorcycle 10 is, for example, a motorcycle of a road sport type. The configuration of the processing system 1 is the same in the motorcycle 10 of a different category.

As shown in FIGS. 1 and 2, the processing system 1 includes a mobile information terminal 2, a cloud server 3, and an in-vehicle antenna 5. The mobile information terminal 2 has a function as an input section which receives information or the like relating to a reaction of a rider 50 and inputs the information to the cloud server 3, and a function as an output section which transmits (sends) information generated by the cloud server 3 to the rider 50. The cloud server 3 has a function as a processor section which generates the information to be output to the rider 50, based on the information input from the mobile information terminal 2. The in-vehicle antenna 5 has a function as a wireless communication section which wirelessly transmits information relating to a vehicle state which is detected by a vehicle sensor 21 to the mobile information terminal 2. For example, the mobile information terminal 2 is configured to wirelessly communicate with the cloud server 3 by use of a network communication such as Internet and configured to wirelessly communicate with the in-vehicle antenna 5 by use of a short-distance wireless communication (Bluetooth (registered mark), RFID (Radio Frequency Identifier), etc.) protocol.

The mobile information terminal 2 is a smart phone (multi-function mobile phone) carried by the rider 50. Note that the mobile information terminal 2 is not limited to the smart phone and may be a tablet terminal, a terminal which is connectable to Internet and does not include a display section, or the like. The information relating to the reaction of the rider 50, which is received by the mobile information terminal 2 includes information relating to a driving operation performed by the rider 50 and information relating to whether or not the information transmitted from the mobile information terminal 2 is good. The mobile information terminal 2 is configured to receive the information relating to the driving operation performed by the rider 50, from a vehicle control unit 6, and configured to receive the information relating to whether or not the information transmitted from the mobile information terminal 2 is good, from an intention input unit 25 provided at a driving operation device 22.

Each of the vehicle control unit 6 and the intention input unit 25 is configured to wirelessly communicate with the mobile information terminal 2 via the in-vehicle antenna 5 and a wireless control unit 7. The in-vehicle antenna 5 is, for example, an antenna for ETC, an antenna for an immobilization amplifier, or an antenna for GPS. Any kind of antenna may be used as the in-vehicle antenna 5 so long as the in-vehicle antenna 5 is able to transmit and receive electric waves. The wireless control unit 7 is electrically connected to the vehicle control unit 6 and the intention input unit 25. The wireless control unit 7 is configured to transmit (send) the information to the mobile information terminal 2 via the in-vehicle antenna 5.

The vehicle control unit 6 is configured to control the vehicle body 15 based on the information detected by the vehicle sensor 21. The vehicle control unit 6 is, for example, an engine ECU (electric control unit) which controls the engine E. The vehicle control unit 6 is disposed in a space formed under a seat. Note that the vehicle control unit 6 is not limited to the engine ECU and may be a meter ECU, an ECU for ABS (Anti-Lock Brake Systems), an ECU for a steering damper, an ECU for an electronically controlled suspension, an ECU exclusively used to transmit the information to the mobile information terminal 2, or the like.

The vehicle sensor 21 has a function as a detector which is mounted in the vehicle body 15 and detects information relating to the vehicle state of the motorcycle 10. The vehicle sensor 21 includes various sensors such as a vehicle speed sensor, an engine speed sensor, a throttle opening rate (opening degree) sensor, a brake pressure sensor, a gear position sensor, an acceleration rate sensor, a gyro sensor, a suspension stroke sensor, a tire pneumatic sensor, a hydraulic (oil pressure) sensor, a water temperature sensor, a seat pressure-sensitive sensor, and a two-person riding detecting sensor. The vehicle sensor 21 is wirelessly electrically connected to the vehicle control unit 6. Alternatively, the vehicle sensor 21 may be electrically connected to the vehicle control unit 6 via a wire. The information detected by the vehicle sensor 21 is transmitted (sent) to the wireless control unit 7 via the vehicle control unit 6. In a case where the vehicle sensor 21 has a CAN (Controller Area Network) communication function, the detected information may be output to the mobile information terminal 2 without sending the information to the vehicle control unit 6 and the wireless control unit 7.

The driving operation device 22 is mounted on the vehicle body 15 and can be operated by the rider 50 during driving. In the present embodiment, the driving operation device 22 is a handle (see FIG. 2). The handle 22 is provided with the intention input unit 25 configured to input whether or not the information transmitted (sent) from the mobile information terminal 2 is good, namely, the intention of the rider 50. Specifically, the intention input unit 25 is an operation button provided on a grip 22*a* of the handle 22.

For example, the operation button 25 includes an OK button 25*a*, and a NG button 25*b*. The rider 50 presses (pushes) the button 25*a* or 25*b* to give an answer to whether or not the information transmitted from the mobile information terminal 2 is good. Specifically, the rider 50 operates the operation button 25 to give the answer to whether or not the content of the information transmitted from the mobile information terminal 2 is good and to whether or not the timing when the information is transmitted is good. The answer given by the rider 50's operation of the operation button 25 is transmitted to the wireless control unit 7 as a digital signal. Note that the intention input unit 25 is not limited to the button, and may be a switch. Also, the intention input unit 25 is not limited to an input unit of the present embodiment, which is manually operated by the rider 50 to input the answer and may be an operation member which is operated by the rider 50's foot.

The mobile information terminal 2 contains therein an external environment information obtaining section 23. The external environment information obtaining section 23 has a function of obtaining external environment information while the motorcycle 10 is traveling. This allows the mobile information terminal 2 to receive the external environment information. For example, the external environment information obtaining section 23 includes a GPS (Global Positioning System) sensor which is connected to a GPS and obtains position information of the motorcycle 10, a weather obtaining section which obtains a weather, a route guide obtaining section which obtains a route guide, a traffic information obtaining section which obtains traffic information, a graphic (map) information memory section which stores graphic information, a road surface information obtaining section which obtains road surface information, an inter-vehicular distance measuring section which measure an inter-vehicular distance (distance between two cars) from a forward vehicle, or the like.

The mobile information terminal 2 is connected to a biological information detecting section 24 via a short distance wireless communication (e.g., Bluetooth (registered mark), RFID or the like). The biological information detecting section 24 has a function as a detector which detects biological information (the rider's physical condition or the like) of the rider 50. This allows the mobile information terminal 2 to receive the biological information of the rider 50. For example, the biological information detecting section 24 is a sensor which measures a body temperature, a heart rate, a blood pressure, or the like, of the rider 50. In the present embodiment, the biological information detecting section 24 is attached on, for example, the wrist of the rider 50. However, the configuration of the biological information detecting section 24 is not limited to this, and the biological information detecting section 24 may be contained (built) in a helmet 51, or attached on the grip 22*a*.

Various information received by the mobile information terminal 2 is wirelessly transmitted to the cloud server 3 provided at a location that is distant from the motorcycle 10 and the rider 50, via a base station (not shown). Specifically, when an antenna (not shown) contained in the mobile information terminal 2 becomes wirelessly communicable with the antenna of the base station, the mobile information terminal 2 is connected to a network such as Internet via the base station. Thus, the information is transmitted to the cloud server 3.

The cloud server 3 includes a communication section 31, a learning section 32, and a memory section 33. The communication section 31 is configured to transmit and receive the information to and from the mobile information terminal 2 via the base station. The learning section 32 is configured to perform learning based on the information input from the mobile information terminal 2 by use of an artificial intelligence (AI) technique. The learning section 32 contains therein voice (speech) synthesis software (e.g., ViaVoice (registered mark) manufactured by IBM (registered mark) Co., Ltd., FineSpeech(registered mark) manufactured by Fujitsu (registered mark) Co., Ltd., or the like)). The learning section 32 is configured to perform voice synthesis based on a learning content, and generate the voice information to be output to the rider 50. The learning section 32 is configured to generate the information to be output, as a voice signal of natural languages so that the information which can be easily recognized by the rider 50 is output. The learning section 32 may change the sex, dialect, country language, or the like of the voice of the voice signal, depending on the preference of the rider 50. Specifically, the learning section 32 may learn the characters (individual characteristics) of the voice information set by the rider 50 and output the voice information corresponding to the preference of the rider 50.

As examples of the voice information generated by and output from the learning section 32, there are vehicle state information, traffic information and maintenance information. The vehicle state information is not limited to the information displayed on a meter device, such as a fuel amount or an engine speed, and may be information which is not displayed on the meter device. As examples of the information which is not displayed on the meter device, there are control information associated with the engine ECU, operation information of ABS or CBS (Combined Brake System), setting information in a fuel injection device, output value of the vehicle sensor 21 (e.g., acceleration rate of the vehicle body 15 or the like), and more detailed information of the information displayed on the meter device. The vehicle state information may include detailed information of an abnormal state in a case where an abnormality occurs in the motorcycle 10. The information of the abnormal state may be output in a stepwise manner depending on an importance level.

The voice information generated by the learning section 32 is not limited to the vehicle state information, or the like. For example, the learning section 32 may generate the information corresponding to the state (mood) of the rider 50, based on the biological information, driving operation trend or the like of the rider 50. Specifically, the learning section 32 may make a difference between information in a case where it is predicted that the rider 50 is in a good condition and information in a case where it is predicted that the rider 50 is in a bad condition. The learning section 32 may generate information relating to traveling assist from a driving operation trend and its related (associated) information. For example, in a case where the body weight of a person riding in the motorcycle 10 is input as the related information, the learning section 32 may make a difference in the information relating to an operation for accelerating/decelerating the motorcycle 10, the information relating to a steering operation, or the like, according to the body weight.

The learning section 32 may make a difference in the content, output frequency or the like of the information according to an answer trend of the rider 50. The learning section 32 may make a difference in the output frequency of the information according to the biological information of the rider 50. For example, the learning section 32 may increase the output frequency of the information in a case where it is predicted that the rider 50 is in a good condition. The learning section 32 may determine whether or not the rider 50 is driving on a new place based on the external environment information, and make a difference in the content, output frequency or the like of the information. The learning section 32 may make a difference in the content, output frequency or the like of the information, between a case where the motorcycle 10 is traveling on a high-speed road and a case where the motorcycle 10 is traveling on an urban area.

The learning section 32 may generate as the voice information a daily conversation or a joke corresponding to the vehicle state and the driving operation trend. For example, the learning section 32 may generate the voice information which allows the rider 50 to recognize that the vehicle state is good and may generate the voice information indicating wony about the state of the rider 50 in a case where the learning section 32 determines that the driving operation is different from that in a normal state.

The voice information generated by the learning section 32 is output to the mobile information terminal 2 via the communication section 31 and the base station. The mobile information terminal 2 transmits the voice information generated by the cloud server 3 to the rider 50. The mobile information terminal 2 is connected to a speaker 52 secured to the helmet 51 worn by the rider 50 by a short distance wireless communication (e.g., Bluetooth (registered mark), RFID, etc.). The speaker 52 is provided at a portion of the helmet 51, which contacts the head of the rider 50. The mobile information terminal 2 is configured to transmit the voice information generated by the learning section 32 to the speaker 52 via a wireless communication unit (not shown) provided at the helmet 51 and thus the rider 50 can recognize this voice information.

Figure 3:
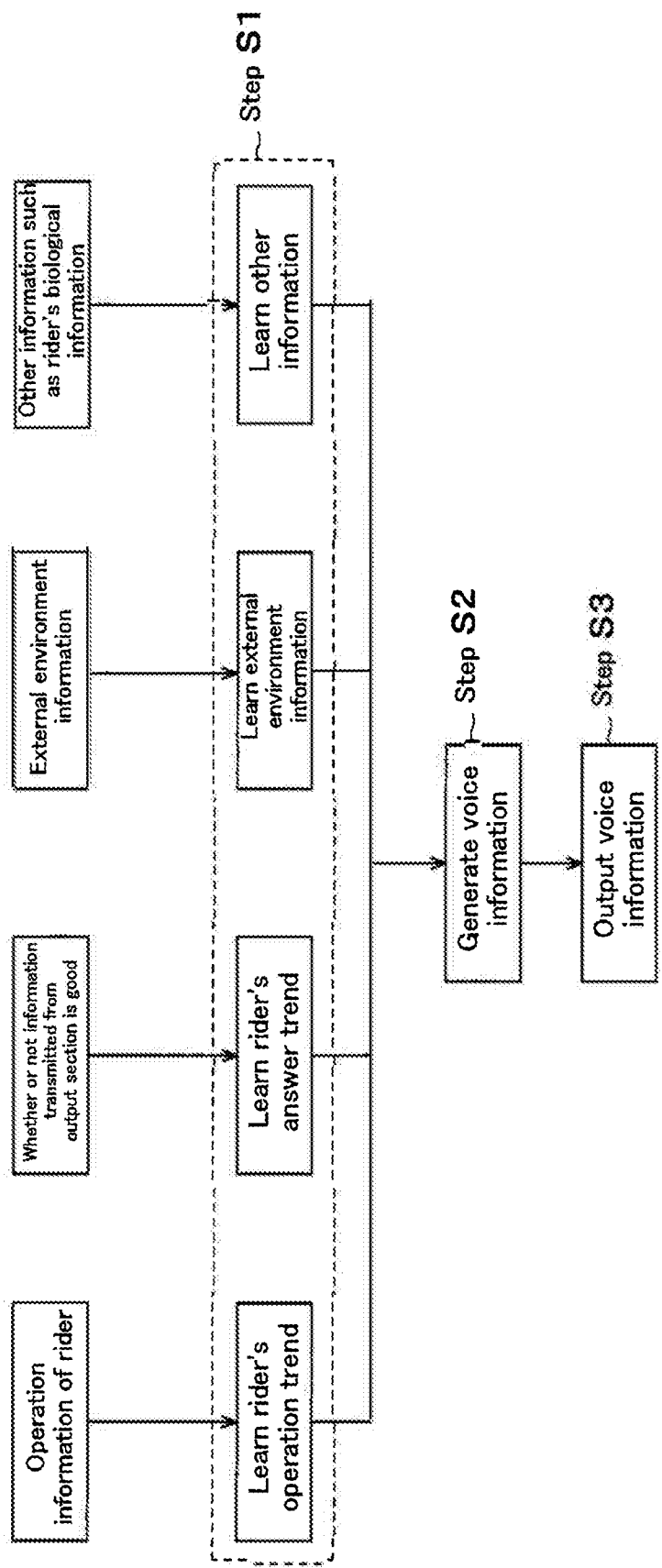
FIG. 3 is a flowchart showing operations performed until voice information is transmitted (sent) to a mobile information terminal, in a cloud server of FIG. 1.

FIG. 3 is a flowchart showing operations performed until the voice information is transmitted (sent) to the mobile information terminal 2, in the cloud server 3 of FIG. 1. As shown in FIGS. 1 and 3, the information relating to the driving operation performed by the rider 50, the information relating to whether or not the information transmitted from the mobile information terminal 2 is good, the external environment information and the other information (e.g., the biological information of the rider 50, learning information in a motorcycle which another rider rides, etc.) are input to the cloud server 3. Initially, in step S1, the learning section 32 performs the learning as described below, based on the input information.

The learning section 32 learns the operation trend of the rider 50 from the information relating to the operation performed by the rider 50, and stores the operation trend in an operation trend storage section 33a. In addition, the learning section 32 learns the answer trend of the rider 50 from the answer input by the intention input unit 25 of the handle 22, and stores the answer trend in an answer trend storage section 33b. The answer (OK or NG in the present embodiment) given by the rider 50 by use of the intention input unit 25, output information corresponding to the answer operation performed by the rider 50, and ambient information (e.g., traveling state of the motorcycle 10 when the information is output) associated with the output information are stored in the answer trend storage section 33b. The output information and the ambient information associated with the output information may be stored in the answer trend storage section 33b in such a manner that the information corresponding to the number of times the rider 50 operates the button is stored, or the information is stored in a statistical manner.

The learning section 32 learns the operation trend of the rider 50 and the answer trend of the rider 50, as the reaction trend of the rider 50. In addition, the learning section 32 learns the external environment information and other information. The learned external environment information is stored in an external environment information storage section 33c, while the other information is stored in an other information storage section 33d. The memory section 33 includes an identification information storage section 33e which stores therein identification information set for each of the riders. The learning section 32 performs the learning while reading the identification information. The memory section 33 further includes an output information storage section 33f which stores therein rules of the output information, and an output timing storage section 33g which stores therein rules of the output timings. For example, the storage sections 33a to 33g are RAMs which are capable of rewriting stored data.

Then, the learning section 32 generates the voice information to be output to the rider 50, by reading the rule of the output information and the rule of the output timing, based on the reaction trend of the rider 50, the external environment information and the other information, which are input (step S2). The voice information generated by the learning section 32 is output to the mobile information terminal 2 (step S3).

The learning section 32 estimates the information and the output timing of the information which are desired by the rider 50 by a statistical method, based on a past learning history. For example, the learning section 32 estimates the information and the output timing of the information which are desired by the rider 50, by an enforced (reinforcement) learning algorithm which is one kind of a machine learning. Specifically, the reaction of the rider 50 is given as a reward with respect to the information generated by the learning section 32 and the output timing of the information. In this way, the learning section 32 learns the information and the output timing of the information which are desired by the rider 50 by a trial-and-error method.

Figure 4:
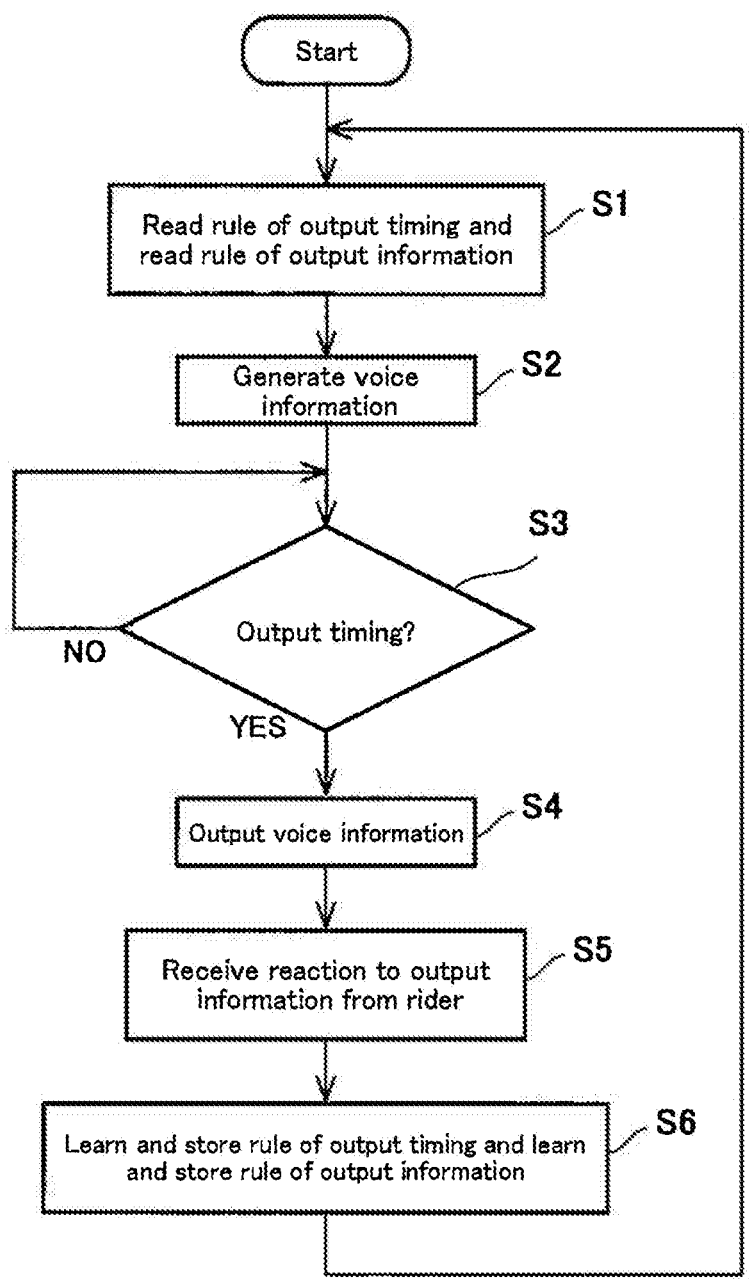
FIG. 4 is a flowchart showing an example of a learning algorithm in a learning section of FIG. 1.

FIG. 4 is a flowchart showing an example of the enforced learning algorithm in the learning section 32 of FIG. 1. As shown in FIG. 4, initially, the learning section 32 reads the rule of the output information and the rule of the output timing, which are set to initial values, based on the various information input from the mobile information terminal 2 (step S1). Then, the learning section 32 generates the voice information based on the read rule of the output information (step S2). Then, the learning section 32 determines whether or not a present time point is the output timing (step S3). In a case where the learning section 32 determines that the present time point is not the output timing in step S3, the process returns to step S2. The learning section 32 defers the output operation until the output timing is reached. On the other hand, in a case where the learning section 32 determines that the present time point is the output timing in step S3, the learning section 32 outputs the generated voice information (step S4).

Then, in step S5, the learning section 32 receives the reaction of the rider 50 to the generated information and the output timing (OK or NG answer given by use of the intention input unit 25, in the present embodiment). Then, in step S6, the learning section 32 performs the learning about the rule of the output information and the rule of the output timing based on the received reaction of the rider 50, and a learning content is stored. For example, in a case where the rider 50 gives NG, the learning section 32 newly estimates the output information and the output timing which are desired by the rider 50. In this way, the learning section 32 performs the learning for altering the rules, and the altered new rules are stored.

After that, the process returns to step S1. In a case where the information similar to the previous input conditions is input to the learning section 32, the learning section 32 reads the altered rule of the output information and the altered rule of the output timing, and repeats step S2 to step S6. The learning section 32 further receives the reaction of the rider 50 to the altered rule of the output information and the altered rule of the output timing. Thus, the learning content is familiarized. As a result, the rule of the output information and the rule of the output timing, which are set to initial values, by the learning section 32, become gradually closer to the output information and the output timing which are desired by the rider 50.

The learning section 32 compares the input information to a past learning history. Thus, for example, the learning section 32 outputs as the output information desired by the rider 50, a distance over which the motorcycle 10 can travel in a case where the fuel amount reaches a predetermined value, information (temperature, presence/absence of an abnormality, etc.) associated with the engine E when a predetermined time has passed after the starting of the engine E, vehicle speed information in a case where the motorcycle 10 passes through a particular location (e.g., a location that is just before a speed trap), detailed information in a case where a vehicle control is initiated, setting information associated with vehicle traveling, suitable traveling assist information (e.g., information indicating proposal of the timing of shift-up or proposal of shifting the body weight while the motorcycle 10 is turning), corresponding to driving skills or body weight of the rider 50, or the like. In a case where the motorcycle 10 travels on a route which it travels every time, the learning section 32 may output information indicative of a difference between present traveling time and previous traveling time at an arrival point of this route, or may output predicted arrival time at a start point of a scheduled route before the motorcycle 10 travels on this route. Or, in a case where a failure occurs in the motorcycle 10, the learning section 32 may output necessary maintenance information (supplementary components, neighborhood maintenance service place, or the like).

The learning section 32 may communicate with the rider 50, regarding the information corresponding to the physical condition of the rider 50, the information corresponding to the driving operation, the information corresponding to the external environment information (weather, temperature, traveling place, etc.), or the like. For example, in a case where it is predicted that the physical condition of the rider 50 is not good, the learning section 32 may generate information which proposes stopping the motorcycle 10. In a case where it is predicted that the weather abruptly changes in a scheduled route, based on the weather information, the learning section 32 may propose changing the route. Or, the learning section 32 may generate information which notifies an event performed in a spot that is in the vicinity of a traveling place. Thus, the learning section 32 may communicate with the rider 50.

For example, the learning section 32 estimates that the output timing desired by the rider 50 is each specified time while the motorcycle 10 is stopped or is traveling. The learning section 32 compares the information relating to timing of acceleration/deceleration of the motorcycle 10, of the information relating to the vehicle state which is input from the mobile information terminal 2, with a past learning history, to determine whether or not a present state is the timing desired by the rider 50. The learning section 32 may estimate the timing desired by the rider 50 based on other information. For example, the timing desired by another rider with the same driving operation trend may be input, and thereby the learning section 32 may estimate the timing desired by the rider 50.

The learning section 32 may output the information estimated as being highly desired by the rider 50, at the output timing estimated according to the taste of the rider 50, in addition to the past learning history. For example, the learning section 32 may regularize the characters of the rider 50 based on the driving operation trend and answer trend of the rider 50, and estimate the content of the output information or the output timing based on the characters. Then, the learning section 32 may receive the answer given by the rider 50 to the output information and alter the regularized characters.

The processing system 1 with the above-described configuration can obtain the following advantages.

The learning section 32 of the cloud server 3 learns the reaction trend of the rider 50 based on the information relating to the reaction of the rider 50, and thus the learning content can be familiarized. In this way, the learning section 32 can generate the information based on the reaction trend of the rider 50, and the information can be transmitted from the mobile information terminal 2 at the timing desired by the rider 50. For example, the output of the information which is not desired by the rider 50 can be reduced, and the rider 50 can obtain the information at a proper timing. The rider 50 can easily focus on the driving operation. Since the learning content is familiarized, the information desired by the rider 50 can be easily transmitted.

The mobile information terminal 2 which is the input section receives the information relating to whether or not the information transmitted from the mobile information terminal 2 to the rider 50 is good. This makes it possible to more familiarize the learning content obtained by the learning by the learning section 32.

Specifically, the rider 50 gives the answer to whether or not the transmitted information is good, by use of the intention input unit 25 of the handle 22 which can be operated during driving, and the answer is transmitted in a digital voice signal format to the mobile information terminal 2 via the wireless control unit 7 and the in-vehicle antenna 5. This makes it possible to transmit the information relating to the reaction of the rider 50 to the cloud server 3, with a higher accuracy, than in a case where the mobile information terminal 2 receives the answer given by the rider 50 in an analog voice signal format.

Since the intention input unit 25 is provided, it can be determined whether or not the output timing or output content of the information estimated by the learning section 32 is good. This allows the information estimated by the learning section 32 to become closer to the taste of the rider 50.

The motorcycle 10 has a display area of the meter device which is smaller than that of the automobile. For this reason, it is difficult to output various information desired by the rider in a limited display area. In the present embodiment, the information generated by the learning section 32 is output as the voice signal. Therefore, it becomes possible to easily output the information desired by the rider 50, in a straddle vehicle such as the motorcycle 10, which has a smaller display area of the meter device.

In the motorcycle 10, a space in which a dedicated switch or the like operated by the rider 50 to request the output of the information is provided at the vehicle body 15 is limited. In the present embodiment, since the information generated by the learning section 32 based on the information input from the mobile information terminal 2 is output to the mobile information terminal 2, the mobile information terminal 2 carried by the rider 50 is a means used to request the output of the information. Therefore, it is not necessary to provide the dedicated switch or the like at the vehicle body 15.

The processing system 1 is able to realize a situation as if the rider 50 could communicate with a person seated in a passenger seat of an automobile by, for example, giving the answer to whether or not the information generated by the learning section 32 is good, in the straddle vehicle which is commonly straddled by one person.

Since the learning content learned by the learning section 32 is familiarized, personality and individual characters corresponding to the motorcycle 10 and the rider 50 are obtained. This allows the rider 50 to feel affection to the motorcycle 10. If the rider 50 changes the motorcycle 10 into new one, the familiarized learning contents obtained before the rider 50 changes the motorcycle 10 can be utilized. This makes it possible to reduce time required to familiarize the learning contents after the rider 50 changes the motorcycle 10 into new one.

Since the learning section 32 learns the reaction trend of the rider 50, a communication between the rider 50 and the motorcycle 10 can be performed, regarding driving skills of the rider 50, settings of components that are associated with vehicle traveling, hobby and taste or the like of the rider 50.

Since the learning section 32 performs the learning while reading the identification information of the rider 50 which is stored in the memory section 33, the learning contents obtained by the learning section 32 can be taken over in a case where the rider 50 changes the motorcycle 10 into new one. This makes it possible to reduce time required to familiarize the learning contents after the rider 50 changes the motorcycle 10 into new one.

Since the answer trend storage section 33b contains therein the output information corresponding to the answer operation performed by the rider 50, in addition to the answer given by the rider 50 by use of the intention input unit 25, the learning section 32 can learn the content of the output information corresponding to the answer trend of the rider 50, and easily output the information desired by the rider 50. Since the answer trend storage section 33b also contains therein the ambient information associated with the output information corresponding to the answer operation performed by the rider 50, the learning section 32 can learn the output timing as well as the content of the output information.

Since the vehicle control unit 6 inputs the information relating to the vehicle state which is received from the vehicle sensor 21 to the learning section 32, the learning section 32 can reflect a present vehicle state and the operation trend of the rider 50 in the learning content, in addition to the answer trend of the rider 50. In this way, for example, the learning section 32 can set the timing when the mobile information terminal 2 transmits the information, based on the vehicle state.

Since the processor section 3 is the cloud server provided at a location that is distant from the motorcycle 10 and the rider 50, durability required for the processor section 3 can be reduced, and manufacturing cost of the processor section 3 can be reduced, compared to a case where the processor is mounted in the vehicle body.

The cloud server 3 generates the information to be output, as the voice signal, and the mobile information terminal which is the output section wirelessly communicates the voice signal between the cloud server 3 and the speaker 52 provided at the helmet 51. This allow the rider 50 to recognize the information without shifting the eyes in the motorcycle 10 in which a driving burden on the rider 50 is high during traveling. Since the output section 2 is the mobile information terminal carried by the rider, durability required for the output section 2 can be reduced, and manufacturing cost of the output section 2 can be reduced.

In a case where the rider 50 owns a plurality of motorcycles, the learning section 32 may learn the reaction trend of the rider 50 so that the reaction trend corresponds to the identification information set for each of the motorcycles (straddle vehicles) and is made different between the motorcycles (vehicles). For example, in a case where the identification information unique to the straddle vehicle is set in the mobile information terminal 2, the mobile information terminal 2 inputs the received various information and the identification information to the cloud server 3. Then, the cloud server 3 checks the input identification information with the identification information pre-stored, to identify the motorcycle driven by the rider 50. After that, the learning section 32 learns the reaction trend or the like of the rider 50. The learning content obtained by the learning section 32 is stored in the storage section made different between the straddle vehicles.

Although the learning section 32 may output the information made different between the straddle vehicles, the learning section 32 may output the information desired by the rider 50 as common information, irrespective of the kind (category) of the vehicle. This makes it possible to utilize the familiarized learning contents even in a case where the rider 50 changes the motorcycle 10 into new one. Therefore, convenience can be improved. Even in a case where the rider 50 changes the motorcycle 10 into new one, the learning section 32 can read the learning contents before the rider 50 changes the motorcycle 10 into new one and continue to perform the learning. As a result, the learning contents can be more familiarized.

Embodiment 2

A processing system 201 according to Embodiment 2 is a modification of the constituents (components) or the like of the processing system 1 according to Embodiment 1. Hereinafter, regarding the processing system 201 according to Embodiment 2, differences from Embodiment 1 will be described.

Figure 5:
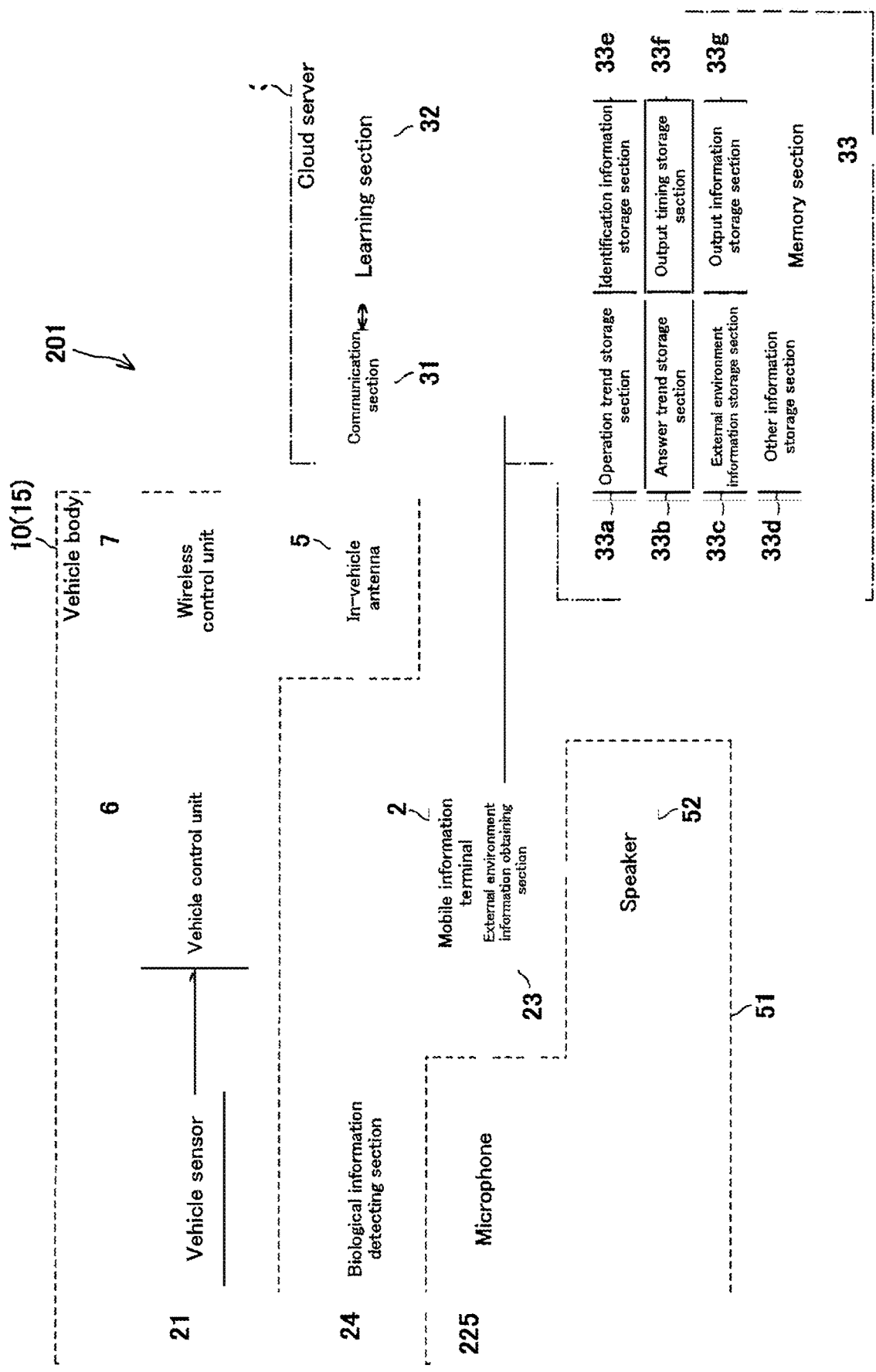
FIG. 5 is a view of a processing system for (for use with) a straddle vehicle according to Embodiment 2, corresponding to FIG. 1.

FIG. 5 is a view of the processing system 201 according to Embodiment 2, corresponding to FIG. 1. As shown in FIG. 5, the helmet 51 is provided with a microphone as an intention input unit 225. For example, the microphone 225 is provided at the helmet 51 at a location corresponding the rider 50's mouth. Specifically, unlike the operation button provided at the handle 22 of Embodiment 1, the rider gives an answer to whether or not the transmitted information is good, by a voice emitted by the rider.

The microphone 225 is connected to the mobile information terminal 2 by the short-distance wireless communication (Bluetooth (registered mark), RFID, etc.). The mobile information terminal 2 contains therein voice recognition software (e.g., Amivoice (registered mark) manufactured by Advanced Media Co., Ltd., Dragon Naturally Speaking (registered mark) manufactured by Nuance (registered mark) Co, Ltd., etc.) which performs voice recognition processing to the voice input through the microphone 225. Thus, the mobile information terminal 2 receives the answer given by the rider, as voice information. The mobile information terminal 2 is used to detect the information relating to the rider's reaction such as the rider's taste, the information desired by the rider, the characters, or the like, from the voice emitted by the rider, as well as receiving the answer given by the rider to the transmitted information. After that, the mobile information terminal 2 inputs the received information to the cloud server 3 via the base station.

As a means which searches the rider's taste or the like from the voice emitted by the rider, for example, the learning section 32 uses document classification processing which is an example of a natural language processing technique. Specifically, the learning section 32 performs extraction processing for extracting a keyword or a phrase from text data obtained by converting the voice information of the rider, to search the rider's taste or the like from a frequency of the keyword or the phrase. To understand the keyword or the phrase in the text data at a higher level, the learning section 32 may perform analysis to determine a relation of dependency between words in the text data to extract a set of a subject and a predicate, in the extraction processing.

The learning section 32 of the cloud server 3 analyzes the voice information of the rider to learn the answer trend of the rider. For example, the learning section 32 analyzes the text data obtained by converting the voice information of the rider, by a text mining method. Specifically, the learning section 32 determines whether or not evaluation information of the rider to the output section is present in the text data. In a case where the learning section 32 determines that the evaluation information is present in the text data, the learning section 32 determines whether this evaluation information is positive (affirmative) or negative to learn the answer trend of the rider. Based on the learned answer trend of the rider, the learning section 32 generates the voice information to be output to the rider. The other constituents are the same as that of Embodiment 1.

In accordance with the above-described configuration, as in Embodiment 1, the learning section 32 of the cloud server 3 learns the reaction trend of the rider based on the information relating to the rider's reaction, and thus the learning content obtained by the learning section 32 can be familiarized. In this way, the learning section 32 can generate the information based on the reaction trend of the rider and the information can be transmitted from the learning section 32 at a timing desired by the rider.

Since the mobile information terminal 2 constituting the input section 202 is connected to the microphone 225 by the short distance communication, the microphone 225 can be placed at a location that is close to the rider's mouth. This makes it possible to improve accuracy of recognition of the voice emitted by the rider through the microphone 225.

In the present embodiment, the microphone 225 is provided at the helmet 51 worn by the rider, in the motorcycle 10 in which it is difficult to lay out the dedicated switch or the like used to request the output of the information, due to a limited vehicle body space. This allows the rider to request the learning section 32 to output the information through the microphone 225. Therefore, it is not necessary to provide the dedicated switch or the like at the vehicle body 15.

Embodiment 3

A processing system 301 according to Embodiment 3 is a modification of the constituents (components) or the like of the processing system 201 according to Embodiment 1. Hereinafter, regarding the processing system 301 according to Embodiment 3, differences from Embodiment 1 will be described.

Figure 6:
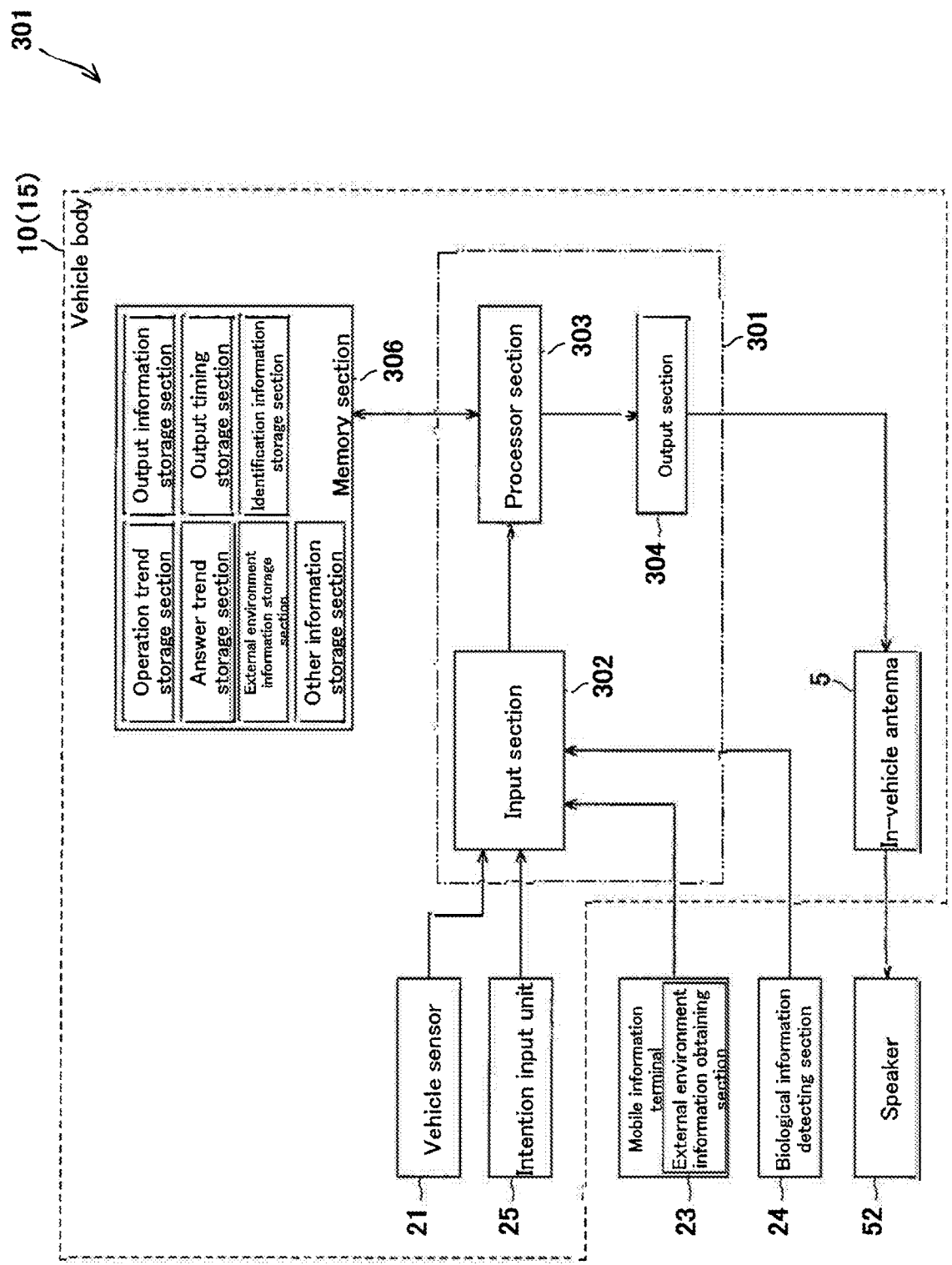
FIG. 6 is a view of a processing system for (for use with) a straddle vehicle according to Embodiment 3, corresponding to FIG. 1.

FIG. 6 is a view of the processing system 301 according to Embodiment 3, corresponding to FIG. 1. As shown in FIG. 6, the processing system 301 of the present embodiment is mounted in the vehicle body 15. Specifically, the processing system 301 includes an input section 302, a processor section 303, and an output section 304 which are integrated with each other. The processing system 301 is, for example, a vehicle controller. The vehicle sensor 21 and the intention input unit 25 which are mounted in the vehicle body 15, and the external environment information obtaining section 23 and the biological information detecting section 24, which are provided outside the vehicle body 15, are connected to the input section 302.

The processor section 303 outputs to the output section 304 the voice information to be output to the rider, based on the learning content. The identification information of the rider, the learning contents obtained by the processor section 303, the information generated by the processor section 303, or the like are stored in a memory section 306 mounted in the vehicle body 15. These information is transmitted from the output section 304 to the speaker 52 via the in-vehicle antenna 5. The other constituents are the same as that of Embodiment 1.

In accordance with the above-described configuration, as in Embodiment 1, the processor section 303 learns the reaction trend of the rider based on the information relating to the rider's reaction, and thus the learning content obtained by the processor section 303 can be familiarized. In this way, the processor section 303 can generate the information based on the reaction trend of the rider and the information can be transmitted from the output section 304 at a timing desired by the rider.

Since the processing system 301 includes the processor section 303, a process for generating the information to be output to the rider can be completed within the vehicle. Therefore, it becomes possible to reduce the time required to transmit the information to the rider.

To reduce a load (burden) on the processing system 301, the processing system 301 may include the input section 302 and the output section 304, and the processor section 303 may be the cloud server provided at a location that is distant from the motorcycle 10 and the rider. In addition, the memory section 306 may be provided outside the vehicle body 15.

The present invention is not limited to the above-described embodiments, and the configuration may be changed, added or deleted within the scope of the invention. The embodiments may be combined as desired. For example, a part of the constituents or method of one embodiment may be applied to another embodiment. A part of the constituents of the embodiment may be separated from the other constituents of the embodiment and extracted. The present invention is not limited to the above-described embodiments, and the mobile information terminal carried by the rider may be a processing system. Further, the processing system may be configured so that the vehicle control unit 6 has a function as an input section, the cloud server 3 has a function as a processor section, and the mobile information terminal 2 has a function as an output section. In this case, the information or the like relating to the reaction of the rider 50 which is received by the vehicle control unit 6 may be input to the cloud server 3 via the in-vehicle antenna 5 and the base station. Although in the above-described embodiments, the processor section 3, 303 is configured to generate the voice information and the rider 50 recognizes this voice information, the present invention is not limited to this configuration. For example, the information generated by the processor section 3, 303 may be displayed as text information on the meter device, or a display device provided at the vehicle body 15, a display device such as a head up display provided at the helmet so that the rider 50 recognize the text information. In a case where the vehicle body 15 is provided with a display device including a liquid crystal display screen of a dot matrix type, information different from the information displayed on the meter device may be displayed on the liquid crystal display screen. Further, the mobile information terminal 2 may be secured onto the vehicle body 15, and the information desired by the rider 50 may be displayed on the display screen of the mobile information terminal 2.

Although in the above-described embodiments, the information relating to the rider's reaction and evaluation for the output information is input by the button 25 provided at the handle 22 or the microphone 25 provided at the helmet 51, the present invention is not limited to these configurations. The rider's biological information may be input as the information relating to the rider's reaction and evaluation for the output information by use of a biological information detecting sensor (e.g., a heart rate sensor, a perspiration (sweat) amount detecting sensor, a brain wave sensor, or the like) contained (built) in the helmet. Although in the above-described embodiments, the vehicle information detected by the vehicle sensor 21 is wirelessly transmitted to the mobile information terminal 2 via the vehicle control unit 6 and then input to the learning section 32, the present invention is not limited to this configuration. For example, the information may be input from the vehicle control unit 6 to the learning section 32 via the in-vehicle antenna 5 without transmitting the information to the mobile information terminal 2. In other words, the vehicle control unit 6 receives the information relating to the driving operation performed by the rider 50, and the input section may be constituted by the vehicle control unit 6 and the mobile information terminal 2. Although in the above-described embodiments, the external environment information obtaining section 23 is mounted in the mobile information terminal 2, the external environment information obtaining section 23 may be mounted in the vehicle body 15. The straddle vehicle is not limited to the motorcycle 10 and may be, for example, ATV (All-Terrain Vehicle).

LIST OF REFERENCE CHARACTERS

1, 201, 301 processing system for straddle vehicle
2 mobile information terminal (input section, output section)
3 cloud server (processor section)
5 in-vehicle antenna (wireless communication section)
10 motorcycle (straddle vehicle)
15 vehicle body
21 vehicle sensor (detector)
22 operation device
25, 225 microphone
50 rider
51 helmet
52 speaker
302 input section
303 processor section
304 output section

The invention claimed is:

1. A processing system for a straddle vehicle, the processing system comprising:
    an input section which receives information relating to a reaction of a rider of the straddle vehicle;
    a processor section which learns a reaction trend of the rider based on the information relating to the rider's reaction which is input from the input section, and generates content of information to be output, based on a learning content of the reaction trend of the rider while making a difference in the content of the information generated by the processor section according to the reaction trend, such that the content of the information corresponding to first content is generated based on the reaction trend indicating a first reaction of the rider, and the content of the information corresponding to second content is generated based on the reaction trend indicating a second reaction of the rider different than the first reaction, the first content being different than the second content; and
    an output section which outputs the content of the information generated by the processor section as information recognizable by the rider,
    wherein the processor section sets an output time point at which the output section outputs the content of the information generated by the processor section, based on the learning content of the reaction trend of the rider while making a difference in the output time point such that the output time point corresponding to a first time point is set based on the reaction trend indicating the first reaction of the rider, and the output time point corresponding to a second time point is set based on the reaction trend indicating the second reaction of the rider different than the first reaction, the first time point being different than the second time point, the output time point being set relative to a vehicle state of the straddle vehicle during traveling, and
    wherein the processor section learns a rule of generation of the first content and the second content based on the rider's reaction to the first content and the second content and/or the processor section learns a rule of setting of the output time point based on the rider's reaction to the output time point.

2. A processing system for a straddle vehicle, the processing system comprising:
    an input section that receives information relating to a reaction of a rider of the straddle vehicle;
    a processor section that learns a reaction trend of the rider based on the information relating to the rider's reaction that is input from the input section, and that generates content of information to be output based on a learning content of the reaction trend of the rider, such that the content of the information corresponding to first information is generated based on the reaction trend indicating a first reaction of the rider, and the content of the information corresponding to second information is generated based on the reaction trend indicating a second reaction of the rider different than the first reaction, the first information being different than the second information; and an output section that outputs the content of the information generated by the processor section as information recognizable by the rider, wherein the information of the first reaction or the second reaction relating to the rider's reaction includes information relating to whether or not the content of the information output from the output section is good, wherein the processor section sets an output time point at which the output section outputs the content of the information generated by the processor section, based on the learning content of the reaction trend of the rider while making a difference in the output time point such that the output time point corresponding to a first time point is set based on the reaction trend indicating the first reaction of the rider, and the output time point corresponding to a second time point is set based on the reaction trend indicating the second reaction of the rider different than the first reaction, the first time point being different than the second time point, the output time point being set relative to a vehicle state of the straddle vehicle during traveling, wherein the processor section learns a rule of generation of first content and second content based on the rider's reaction to the first content and the second content and/or the processor section learns a rule of setting of the output time point based on the rider's reaction to the output time point, and wherein the content of the information includes at least one of state information of the vehicle during traveling, position information of the vehicle during traveling, traveling assist information corresponding to driving skills or biological information of the rider, necessary maintenance information in a case where a failure occurs in the vehicle, or neighborhood maintenance service place information in a case where a failure occurs in the vehicle.

3. The processing system for the straddle vehicle according to claim 2, wherein the input section receives the information relating to the rider's reaction from an operation device which is mounted in a vehicle body of the straddle vehicle and is capable of being operated by the rider during driving of the straddle vehicle.

4. The processing system for the straddle vehicle according to claim 3,
wherein the input section further receives information relating to the vehicle state of the straddle vehicle during traveling which is detected by a detector mounted in the vehicle body, and
wherein the processor section learns the reaction trend of the rider and the vehicle state during traveling, and generates the content of the information to be output as the information recognizable by the rider, based on the learning content of the reaction trend of the rider and a learning content of the vehicle state during traveling.

5. The processing system for the straddle vehicle according to claim 2, wherein the input section further receives information relating to the vehicle state of the straddle vehicle during traveling which is detected by a detector mounted in a vehicle body of the straddle vehicle, and
wherein the processor section learns the reaction trend of the rider and the vehicle state during traveling, and generates the content of the information to be output as the information recognizable by the rider, based on the learning content of the reaction trend of the rider and a learning content of the vehicle state during traveling.

6. The processing system for the straddle vehicle according to claim 5,
wherein the input section and the processor section are disposed outside the vehicle body,
wherein the processing system further comprises a wireless communication section which wirelessly transmits the information relating to the vehicle state during traveling which is detected by the detector, to the input section, and
wherein the wireless communication section is mounted in the vehicle body.

7. The processing system for the straddle vehicle according to claim 5,
wherein the processor section is a server provided at a location that is distant from the vehicle body and the rider, and
wherein the input section is carried by the rider and wirelessly communicates with the processor section and the detector.

8. The processing system for the straddle vehicle according to claim 2,
wherein the processor section learns the reaction trend of the rider so that the reaction trend of the rider corresponds to identification information set for the rider of the straddle vehicle.

9. The processing system for the straddle vehicle according to claim 2,
wherein the processor section learns the content of the information and the output timing by giving the reaction of the rider as a reward.

10. The processing system for the straddle vehicle according to claim 2,
wherein the information relating to the reaction of the rider includes biological information of the rider, and
wherein the processor section makes a difference in an output frequency of the information according to the biological information.

11. The processing system for the straddle vehicle according to claim 2,
wherein the input section receives the information relating to the reaction of the rider from a voice emitted by the rider.

12. The processing system for the straddle vehicle according to claim 2, wherein the content of the information generated by the processor section includes position information of the vehicle during traveling.

13. The processing system for the straddle vehicle according to claim 2, wherein the content of the information generated by the processor section includes traveling assist information corresponding to driving skills or biological information of the rider.

14. The processing system for the straddle vehicle according to claim 2, wherein the content of the information generated by the processor section includes necessary maintenance information in a case where a failure occurs in the straddle vehicle.

15. The processing system for the straddle vehicle according to claim 2, wherein the content of the information generated by the processor section includes neighborhood maintenance service place information in a case where a failure occurs in the straddle vehicle.

\* \* \* \* \*